(12) United States Patent
Wang et al.

(10) Patent No.: US 11,210,236 B2
(45) Date of Patent: Dec. 28, 2021

(54) MANAGING GLOBAL COUNTERS USING LOCAL DELTA COUNTERS

(71) Applicant: EMC IP Holding Company LLC, Hopkinton, MA (US)

(72) Inventors: Yubing Wang, Southborough, MA (US); Ajay Karri, South Grafton, MA (US); Philippe Armangau, Acton, MA (US); Vamsi K. Vankamamidi, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 227 days.

(21) Appl. No.: 16/659,940

(22) Filed: Oct. 22, 2019

(65) Prior Publication Data

US 2021/0117339 A1     Apr. 22, 2021

(51) Int. Cl.
*G06F 12/126*     (2016.01)
*G06F 12/0804*     (2016.01)

(52) U.S. Cl.
CPC ........ *G06F 12/126* (2013.01); *G06F 12/0804* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 6,279,037 B1 | 8/2001 | Tams et al. | |
| 6,928,459 B1 | 8/2005 | Sawdon et al. | |
| 7,401,102 B2* | 7/2008 | Factor | G06F 11/3485 |
| | | | 707/700 |
| 10,126,988 B1* | 11/2018 | Han | G06F 3/0619 |
| 2003/0069952 A1 | 4/2003 | Tams et al. | |
| 2016/0057217 A1* | 2/2016 | Beaverson | G06F 16/183 |
| | | | 707/827 |
| 2019/0004922 A1* | 1/2019 | Browne | G06N 5/045 |

* cited by examiner

*Primary Examiner* — Prasith Thammavong
*Assistant Examiner* — Edmund H Kwong
(74) *Attorney, Agent, or Firm* — BainwoodHuang

(57) ABSTRACT

A data storage system performs updating of a set of global counters stored in persistent storage accessible to a plurality of processing nodes of a data storage system, the global counters storing respective global count values describing associated units of data storage shared by the processing nodes for performing data storage operations. The updating includes, by each processing node, using a respective set of in-memory delta counters storing respective delta count values to track changes to respective global count values due to data storage operations performed by the processing node with respect to the units of data storage. A summarization process is regularly executed to merge the delta count values of the delta counters of all processing nodes into the respective global counters.

20 Claims, 5 Drawing Sheets

MANAGING GLOBAL COUNTERS USING LOCAL DELTA COUNTERS

BACKGROUND

The invention is related to the field of data storage systems, and in particular to data storage systems employing counters for tracking counts related to units of data storage, such as free/allocated block counts, etc.

SUMMARY

In a distributed system such as a data storage system employing multiple processing nodes, global counters are shared by the multiple nodes, and the counters can be accessed and updated in any of those nodes. Synchronizing the updates of global counters across multiple nodes is a challenging task because the communication between nodes could be very expensive, especially if that communication occurs very frequently.

A technique is disclosed for synchronizing updates of global counters across multiple nodes. The scheme maintains the consistency of the global counters while minimizing the communication across nodes. A data storage system performs updating of a set of global counters stored in persistent storage accessible to a plurality of processing nodes of a data storage system, the global counters storing respective global count values describing associated units of data storage shared by the processing nodes for performing data storage operations. The updating includes, by each processing node, using a respective set of in-memory delta counters storing respective delta count values to track changes to respective global count values due to data storage operations performed by the processing node with respect to the units of data storage. A summarization process is regularly executed to merge the delta count values of the delta counters of all processing nodes into the respective global counters.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

In a distributed system, global counters are shared by multiple nodes, and the counters can be accessed and updated in any of those nodes. Synchronizing the updates of global counters across multiple nodes is a challenging task because the communication between nodes could be very expensive, especially if that communication occurs very frequently.

A technique is disclosed for synchronizing updates of global counters across multiple nodes. The scheme maintains the consistency of the global counters while minimizing the communication across nodes. An embodiment is disclosed in which the scheme is used to update counters for data storage units referred to as "ubers" in a mapper layer. An uber is a logical extent which is mapped to 64-GB address space of a volume. Each uber is further divided into eight sub-ubers each 8 GB in size. A set of counters are defined to describe the ubers and sub-ubers, such as the number of free blocks, the average utilization of blocks, etc. A data storage system may support some maximum number of such data storage units, e.g., up to 64 k ubers (512 k sub-ubers), and each unit can be accessed from multiple nodes concurrently. Therefore, the scheme should provide for concurrent updating of the counters from multiple nodes without introducing too much overhead (e.g., use of communication bandwidth).

Main aspects of this scheme include:

- Each node maintains local in-memory counters (delta counters) that record any updates for the global counters occurring in that node.
- The update of a global counter occurs locally in a node through delta counters.
- The local updates are summarized into a persistent cache page that can be accessed by all the nodes.
- The summarization of delta counts can be done either periodically or on demand depending on the accuracy requirements from applications.
- The summarization is a background process that is separated from critical IO path.
- The in-memory delta counters can be recovered in case of system crash.

In one embodiment, the in-memory delta counts track the number of free blocks, the total utilization of data storage units, and a number of valid virtuals. These counters help in determining the best candidate data unit for garbage collection, space reclaim, relocation, etc. Also, the system wide counters can include the number of free physical blocks in the system, as well as block utilization buckets which gives a view of the system. The counters help in determining average block utilization in the system, and can be used in policy making whether to expand more storage, when to do compact and append, help in garbage collection, etc. The counters may also help in reporting useful information to a user, such as average compression ratio, the utilization of the system. The counters can be used to generate warning events to notify the user that the system is running out of free space and it is necessary to add more physical storage (e.g., disk drives).

Embodiments

Figure 1:
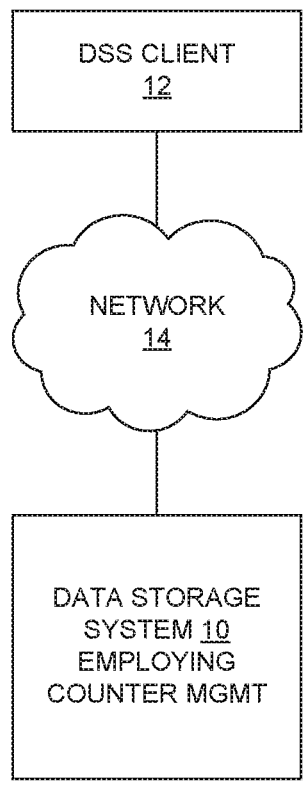
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 14 conveying data storage requests and responses, as well as associated data. For example, a DSS client 12 performs a write operation to a block-oriented storage device by issuing a write request that specifies the device, the starting logical address, and the length, as well as the associated write data. The network 14 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 14 conveys the read request to the data storage system 10, which obtains the data from the specified device beginning at the specified logical address and returns the data to the DSS client 12 via the network 14. The data storage system 10 may present storage resources to the DSS clients 12 in additional or alternative ways, such as in the form of a network-level or distributed file system, or as virtual volumes or similar virtualized storage containers for use by DSS clients 12 hosting virtual machines, such as ESX® hosts (servers) for example.

As indicated at 10, the data storage system 10 employs a certain technique of managing counters that are used in connection with data storage operations. Details and advantages of this technique are described below.

Figure 2:
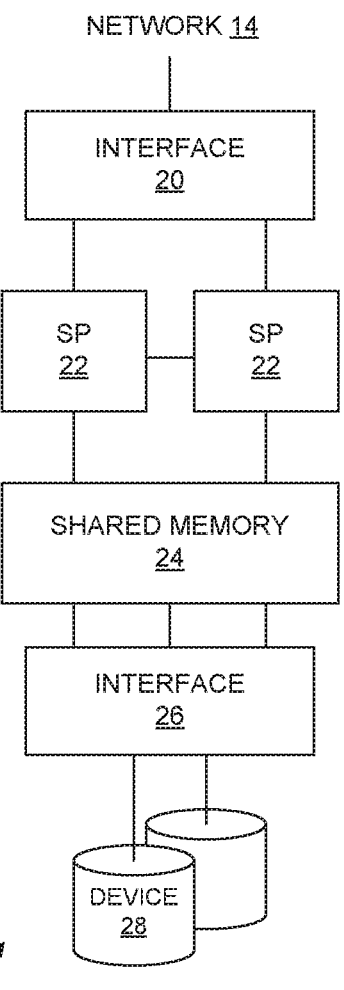
FIG. 2 is a block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. In the remaining description, a storage processor 22 may also be referred to as a "node". The configuration of FIG. 2 is illustrative but not necessarily limiting—the disclosed technique may be practiced more generally in configurations having a plurality of processing nodes, and in configurations where the processing nodes may be more loosely coupled than in the arrangement of FIG. 2. Further details of the structure and operation of the data storage system 10 are provided below.

Figure 3:
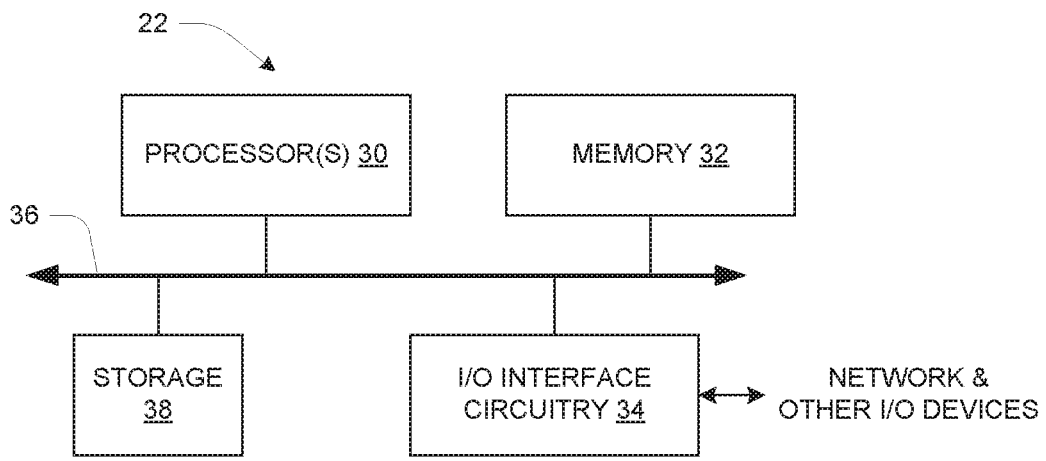
FIG. 3 is a hardware block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner.

Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
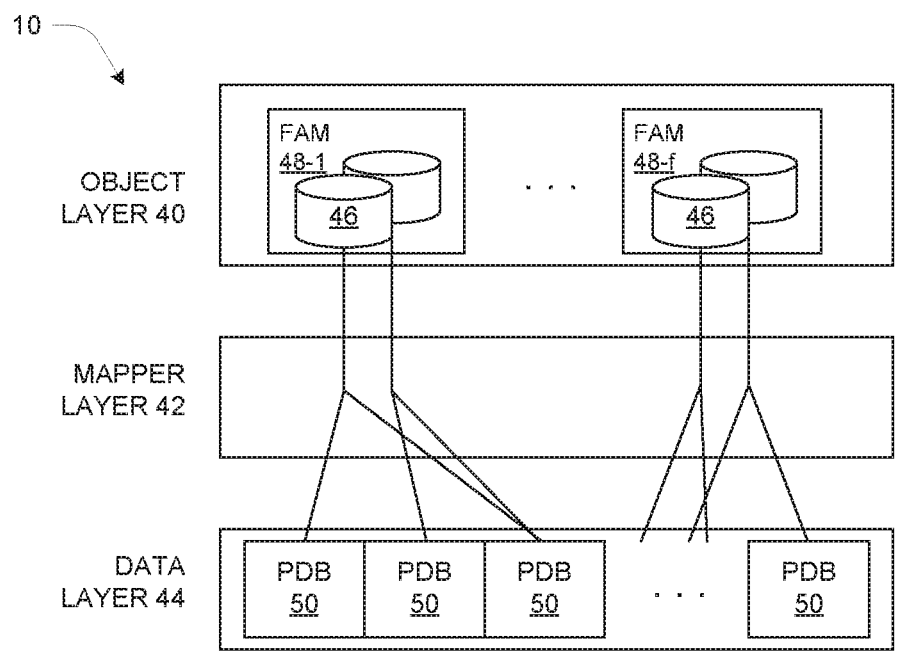
FIG. 4 is schematic diagram of a multi-layer functional organization of a data storage system.

FIG. 4 is a functional/logical view of certain aspects of the data storage system 10. It will be appreciated that much of the functionality is realized by software executed by the storage processors 22, apart from the physical storage of data which is provided by the devices 28 (FIG. 2). In the view of FIG. 4 there are three functional layers—an object layer 40, a mapper layer 42 and a data layer 44. These are described in turn.

The object layer 40 establishes and maintains logical views of the secondary storage that are referred to as volumes 46, and presents the volumes 46 to the hosts 10 (FIG. 1) as the objects of storage operations (e.g., reads and writes). The volumes 46 may be organized into families 48 (shown as FAM 48-1, . . . , FAM 48-*f*) as shown, where the volumes 46 of a family 48 include a current or "primary" volume 46 and a collection of point-in-time copies of that primary volume, referred to as "snapshot" volumes 46 (or simply "snapshots" or "snaps").

The data layer 44 maintains the actual data for the volumes 46, as respective collections of physical data blocks (PDBs) 50. In one embodiment, the PDBs 50 are physical data blocks of an internal file system of the mapper layer 42. The PDBs 50 are of a fixed size, such as 2 MB. The PDBs 50 may be stored in any of a variety of ways on a set of nonvolatile secondary storage media, such as magnetic media, flash-programmable semiconductor media (Flash), etc. Moreover, there may be additional layers of logical structure that translate between the PDB-view of the data and actual physical storage as provided by physical storage devices 28. For example, in one embodiment, raw physical storage provided by storage devices 28 may be carved into large extents from which are served block-sized units for allocation to the volumes 46 and storage of the corresponding data.

The mapper layer 42 is responsible for translating between the logical-volume view of the object layer 40 and the PDB structuring of the data layer 44. As shown in simplified form, each volume 46 is mapped to a corresponding collection of PDBs 50 by the mapper layer 42. As also simply illustrated, in some cases a given PDB 50 may belong to more than one volume 46, i.e., the mapper layer 42 may map logical data blocks of multiple volumes 46 to the same PDB 50. This feature is referred to as "block sharing", and is used in support of snapshot functionality, for example.

Figure 5:
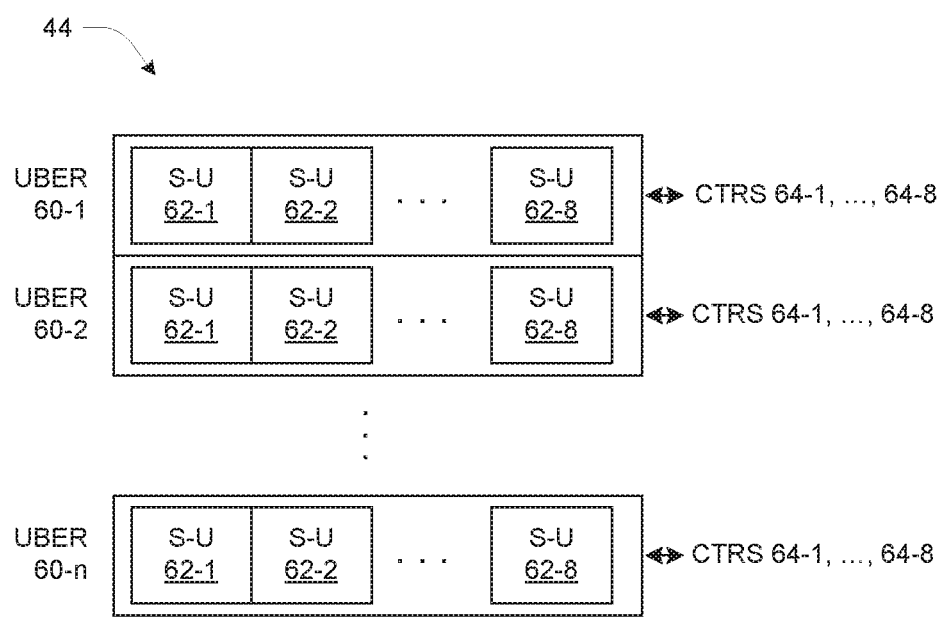
FIG. 5 is a schematic diagram of organization of physical storage.

FIG. 5 illustrates additional structure of the data layer 44. Raw storage space is divided into large extents called "ubers" 60, and each uber 60 is divided into a set of equal-size "sub-ubers" (S-U) 62. A collection of ubers 60 is shown as 60-1, 60-2, . . . , and the sub-ubers 62 of a given uber 60 are shown as 62-1, 62-2, . . . . Each sub-uber 62 has an associated set of counters 64, shown as 64-1, 64-2, . . . for each uber 60. The content and use of the counters 64 is described more below. In one embodiment, each sub-uber 62 has a size of 8 GB, and there are eight sub-ubers 62 per uber 60 (so that each uber 60 has size 64 GB). Other configurations are possible. Generally a system will support some large number of ubers 60 and a corresponding number of sub-ubers 62. For example, a DSS 10 may support up to 64K ubers 60 (i.e., n=64K in FIG. 5), which is equal to 512K sub-ubers 62. Thus in such an embodiment there may be 512K sets of counters 64. Additionally, each sub-uber 62 is accessible to all SPs 22, which means that there could be substantial communications activity just for using and updating the counters 64. The presently disclosed technique addresses certain challenges of using and managing such a potentially large number of counters across a set of nodes (e.g., SPs 22).

Briefly, the counters 64 for each sub-uber 62 maintain counts that are used by the mapper 42 in managing the use of physical storage space. For example, respective counters might be used to track the number of free blocks, average block utilization, etc. for each sub-uber 62, and these values can be used in processes of allocating storage space to volumes 46, re-mapping in response to higher-level operations (e.g., space reclamation when a volume is moved or re-sized), etc. Additionally, such operations also result in updating the respective counts, e.g., reducing the count of free blocks whenever a set of blocks is newly allocated, or increasing the count of free blocks when blocks have been deallocated.

Figure 6:
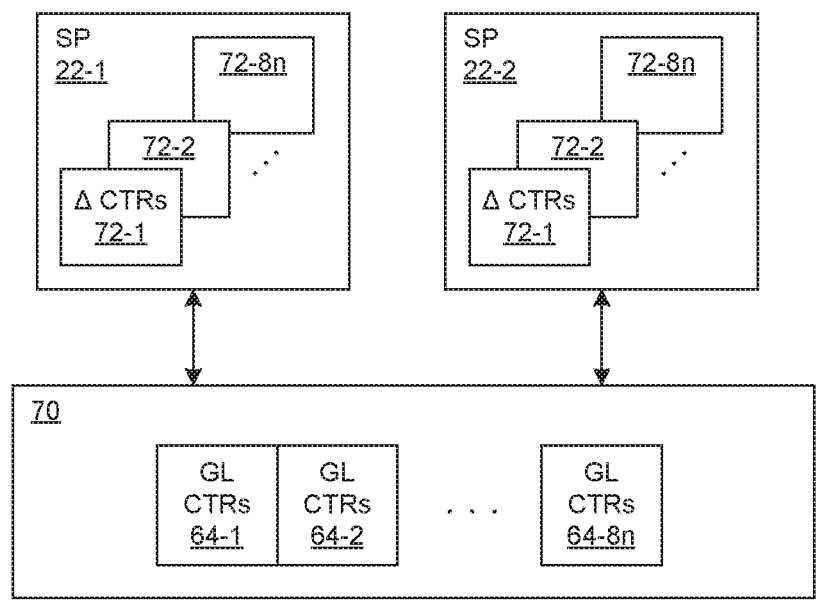
FIG. 6 is a schematic diagram of an organization of counters in a data storage system.

FIG. 6 illustrates an arrangement employed to manage the use and updating of the counters 64. The counters 64 are shown as "global counters" (GL CTRs) 64-1, 64-2, . . . , one set for each sub-uber 62. These are stored in a non-volatile or "persistent" structure 70 accessible to all the SPs 22, e.g., on the devices 28 for example. The persistent structure 70 is also referred to as a persistent "page" herein. Each SP 22 maintains respective sets of in-memory "delta counters" (Δ CTRs) 72-1, 72-2, . . . (generally 72) corresponding to the sets of global counters 64-1, 64-2, . . . . Each delta counter 72 is used to track changes to a respective global counter 64 arising from node-local operations, i.e., operations such as new allocations, etc. occurring at the respective SP 22. On a regular basis, the delta counts maintained by the delta counters 72 are merged into the global counters 64 by a summarization process, described in more detail below. By using the local delta counters 72 in each SP 22, the amount of traffic and processing devoted to updating the global counters 64 is substantially reduced, improving system performance in this respect. In operation, the delta counters 72 are reset (set to zero) each time their delta count values are successfully merged into the respective global counts maintained by the global counters 64.

Figure 7:
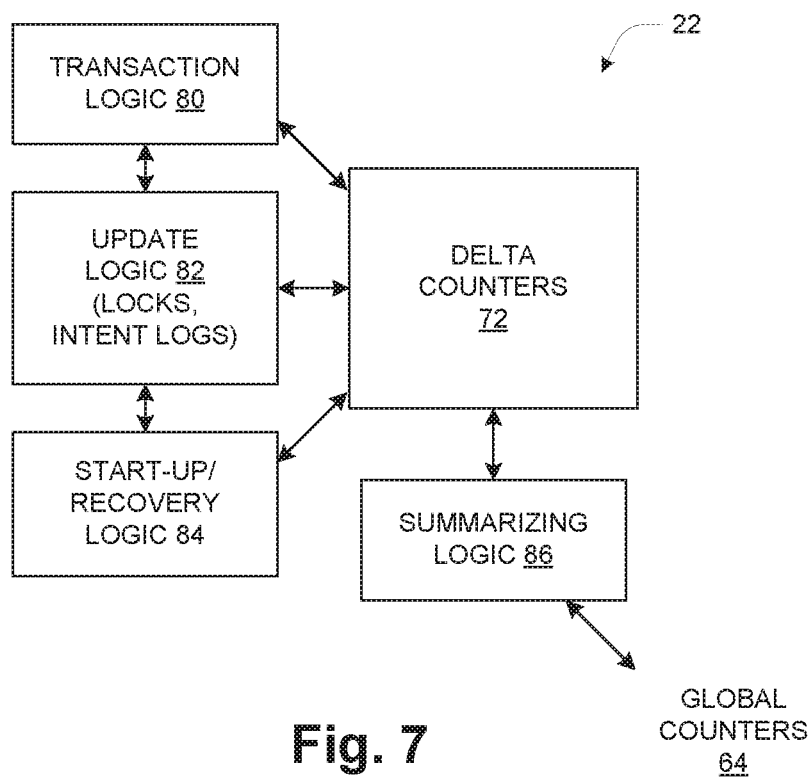
FIG. 7 is a functional block diagram of counter-related functionality in a data storage system.

FIG. 7 shows a functional organization of an SP 22 relating to the management of the counters 64. The functional blocks including the delta counters 72, transaction logic 80, update logic 82, start-up/recovery logic 84, and summarizing logic 86. It will be appreciated that these are software-implemented functional blocks, i.e., they are realized by the execution of corresponding computer program instructions by processing circuitry of the SP 22. The transaction logic 80 performs the operations that consume or release storage space, e.g., user I/O operations, snapshot operations, garbage collection or other space-reclaiming operations, etc. The update logic 82 performs the updating of the local delta counters 72 in connection with these operations. As indicated, the update logic 82 employs locks and intent logs, the locks being used for coordinating access, and the intent logs being used for committing updates, as described more below. The start-up and recovery logic 84 performs certain operations related to tracking and maintaining integrity of the delta counters 72, and the summarizing logic 86 performs the summarization process by which local delta counts are merged into the global counters 64, all as described more below.

Figure 8:
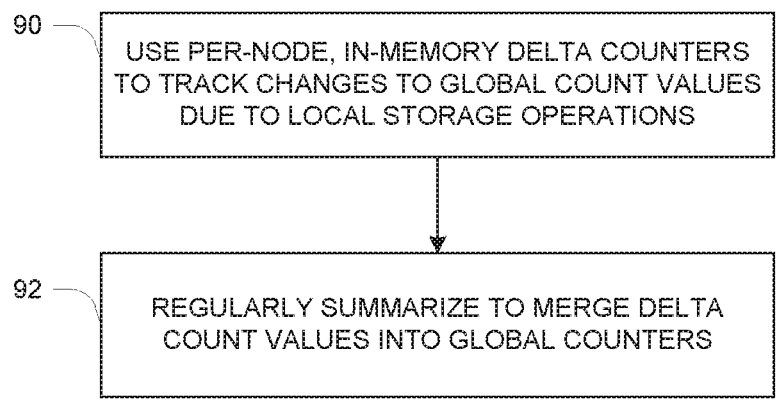
FIG. 8 is a flow diagram of basic counter-related operation.

FIG. 8 illustrates basic operation at a high level, i.e., operation directed to updating a set of global counters (e.g., 64) stored in persistent storage accessible to a plurality of processing nodes (e.g., 22) of a data storage system, the global counters storing respective global count values describing associated units of data storage (e.g., 62) shared by the processing nodes for performing data storage operations.

At 90, each processing node uses a respective set of in-memory delta counters (e.g., 72) storing respective delta count values to track changes to respective global count values due to data storage operations performed by the processing node with respect to the units of data storage.

At 92, the system regularly performs executes a summarization process to merge the delta count values of the delta counters of all processing nodes into the respective global counters. As described more below, this process may be initiated periodically and/or on demand, consistent with system requirements for accuracy for example.

The following are additional specifics use in one or more embodiments:
  Each node 22 maintains local in-memory counters (delta counters 72) that record any updates for the global counters 64 occurring in that node
  The update of a global counter 64 occurs locally in a node 22 through delta counters 72
  The local updates are summarized into a persistent cache page 70 that can be accessed by all the nodes 22.
  The summarization of delta counts can be done either periodically or on demand depending on the accuracy requirements from applications (more frequently where greater count accuracy is required).
  The summarization is a background process that is separated from critical IO path.
  The in-memory delta counters can be recovered in case of system crash (additional details below).

Each node maintains local in-memory delta counters 72 that record the changes for the for the global counters 64 occurring in that node. Because the update happens locally and in-memory, it avoids expensive cross-node communications. This can be a big advantage especially when a large number of counters are used, such as the above-described configuration in which there could be up to 512K counters to track counts for all sub-ubers 62 of a system.

Referring back to FIG. 7, functions of the various components are now described in additional detail.

Locking Mechanism (Function of Update Logic 82)

To synchronize the access and update for such many delta counters, an efficient locking mechanism is used. With the large number of delta counters 72, it is infeasible to assign each delta counter 72 a unique lock. Instead, the delta counters are divided into groups, and each group is assigned a unique lock. Grouping may be done in a variety of ways. To reduce locking contention, it is preferable to avoid putting delta counters into the same lock group that are likely to be used concurrently, such as the sub-ubers 62 of a given uber 60. Thus one grouping may group together corresponding sub-ubers 62-$i$ from across a set of ubers 60, i.e., all sub-ubers 62-1 of the set of ubers into a first group, all sub-ubers 62-2 into a second group, etc., each having its own unique lock used to maintain coherence in the face of independent simultaneous access.

Intent Based Counter Updates (Function of Update Logic 82)

The update of an in-memory delta counter 72 is normally part of a transaction for meta data, and the counter 72 could be updated multiple times in one transaction. However, because a delta counter 72 is an in-memory data structure, its update is not transactional. To update a delta counter 72 in an all-or-nothing fashion, an intent log may be used for each delta counter. When an update for a delta counter 72 occurs, a record is added into the intent log. When the transaction that triggers the delta counter update is committed, the updates in the intent log are played out and a new value is set to the delta counter 72. If the transaction is aborted, the intent log is not played out, and the delta counter 72 is not modified.

Summarization of Delta Counters (Function of Summarizing Logic 86)

The local updates (delta counts) are summarized into the persistent cache page 70 that can be accessed by all the nodes 22. The total count for each sub-uber 62 is obtained by adding the respective delta counts from different nodes 22 to the existing count in the cache page. The summarization of delta counts can be done either synchronously (on demand) or more periodically (e.g., as a background daemon process) depending on the accuracy requirements from applications. If the application allows the counter 64 to be off to some degree, the summarization can occur periodically. The interval between summarizations determines the degree of counter accuracy. More frequent summarizations result in more up-to-date counter values but introduce more overhead (update traffic). When strict accuracy is required, the delta counters can be forced to be summarized to get accurate count. The DSS 10 may support multiple summarization policies (selectable by configuration, for example) to meet the accuracy requirements of different applications.

Recovery of Delta Counters (Function of Start-up/Recovery Logic 84)

The delta counters 72 are volatile, in-memory items, and thus if a node 22 crashes, the delta counters 72 in that node will be lost. To maintain consistency, it is important to correctly recover in case of node crash. It is generally not feasible to recover the actual delta count values at the time of a crash. Rather, the recovery process actually re-calculates the correct values for the global counters 64 and sets all the delta counters 72 to zero, effectively re-starting the system from an accurate state. The re-calculation involves scanning the sub-ubers 62 as needed, and resetting global count values to match their actual state. Thus for each free block counter, for example, the respective sub-uber 62 is scanned and the actual free blocks are counted, then the actual count is stored into the global free block counter 64 for that sub-uber 62. The other count values are obtained and used to update respective global counters 64 in a similar manner.

Figure 9:
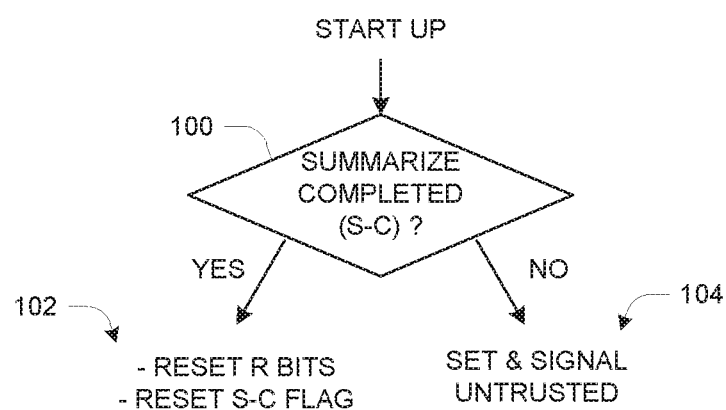
FIG. 9 is a flow diagram of start-up logic.
Figure 10:
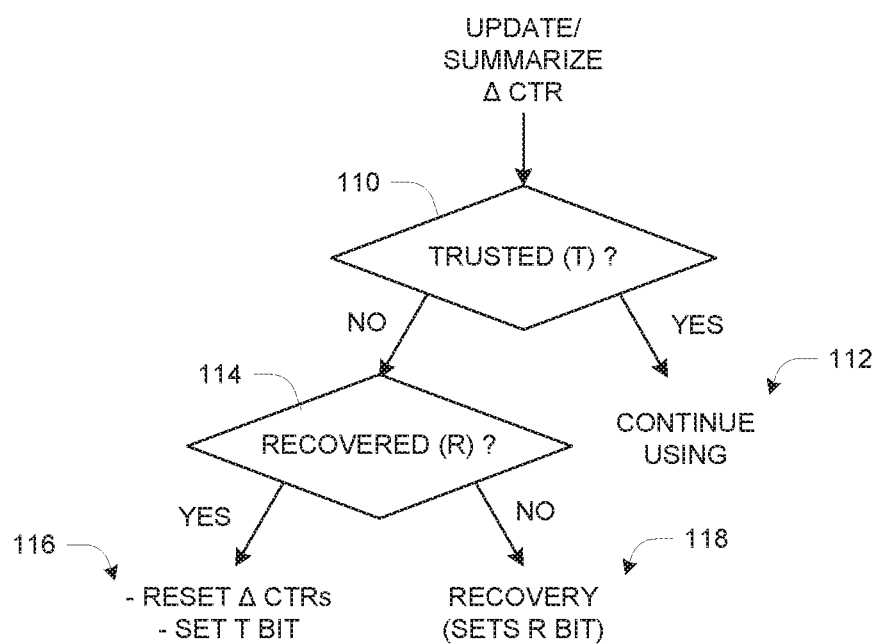
FIG. 10 is a flow diagram of update/summarization logic.

FIGS. 9-10 are used to describe aspects of recovery, which includes functionality performed at different times by different actors. First it is necessary to distinguish between a normal node shutdown and a "crash", i.e., an abnormal and uncoordinated termination of normal operation. In a normal node shutdown, the summarizing logic 86 is activated to summarize all the delta counters 72 to the persistent cache page 70 before the node 22 goes down. In this case, the delta counters 72 are all set to zero as part of the shutdown and they can be used on the subsequent re-start; there is no need to recover them. Thus, as part of the normal shutdown the summarizing logic 86 sets a "summarization completed" (S-C) flag. In a crash scenario, this S-C flag is not set. Thus, at start-up time, the value of the S-C flag indicates whether a normal shutdown and summarization occurred. If the S-C flag is not set, then it indicates that recovery is necessary.

FIG. 9 illustrates subsequent start-up operation. This logic includes manipulation of certain signaling bits referred to as "recovery" (R) and "trusted" (T) bits, which are described further below. At 100 the S-C flag is tested to ascertain whether the summarizing completed, i.e., a normal shutdown occurred. If so, then at 102 the S-C flag itself is reset along with the "recovery" (R) bits, described more below. The reset S-C flag indicates that they system is in its normal running state with volatile delta counters 72, prior to execution of the normal shutdown process. The node 22 then resumes operation with use of the delta counters 72 in their current states. If at 100 the S-C flag indicates that the summarizing did not complete, i.e., that a crash may have occurred, then at 104 the "trusted" or "T" bits are reset, indicating that the local delta counters 72 are not usable and may require recovery. Additionally, the node 22 signals to the other node(s) 22 that they should also reset their T bits, so that all nodes perform testing and conditional recovery as described more fully below.

As noted, each node 22 maintains a set of R (recovered) bits and a set of T (trusted) bits. In one embodiment, there is one R bit and one T bit per sub-uber 62. Other configurations are possible. Generally there should be an (R, T) pair per unit of scan during the recovery process. The remaining description focuses on operations for a single uber 62, and it will be appreciated that these operations are repeated for other ubers 62 as they are triggered by use/access. This process is an on-demand process, i.e., delta counters 72 are recovered as they need to be used in subsequent operation. Alternative embodiments may employ other recovery logic.

For each sub-uber 62, the T bit indicates whether the delta counters 72 can be trusted. As described above, when a node 22 crashes and later starts back up, it sends a message to the other node(s) 22 informing them that its delta counters are not trustworthy. After receiving this message, the other nodes reset their T bits (for all sub-ubers 62) indicating the delta counters have been compromised. The T bits are then used for conditional recovery as described below.

Also for each sub-uber 62, the R bit indicates whether the recovery for the delta counters 72 has been done. When an R bit is set, meaning the delta counters 72 for the sub-uber 62 have been recovered, then all the nodes 22 reset their corresponding delta counters and set their T bits, as described more below.

FIG. 10 illustrates the logic for detecting the need for recovery and initiating it as necessary. This logic is performed in connection with the regular updating of a delta counter 72 as well as in the summarizing process for the delta counter 72. In both cases it is necessary to know whether the delta count is accurate before using it, and to initiate recovery if needed. It will be appreciated that the first attempted update or summarization for a given delta counter 72 results in recovery for the entire sub-uber 62 (all its associated delta counters 72).

At 110, the T bit is tested to ascertain whether the delta count is trusted. If so, then the delta count can just be used in its normal way, as indicated at 112. If the T bit is not set, which occurs after a crash as explained above, then at 114 the R bit is tested to ascertain whether the recovery for this sub-uber 62 has been done. If so, then at 116 the delta counters 72 are reset to zero and the T bit is set, and normal use of the delta counters 72 resumes. If at 114 the R bit is not set, indicating that recovery has not yet been performed, then at 118 the recovery process is performed. This results in setting the R bit, so that a subsequent iteration of the logic of FIG. 10 results in the operation 116 that sets the T bit, enabling subsequent normal use of the delta counters 72. As noted above, in a subsequent start-up after a normal shutdown, all R bits are reset.

The recovery at 118 of the delta counters 72 for a sub-uber 62 starts when the sub-uber 62 is selected for block allocation. A block allocation process scans the blocks of the sub-uber 62 to obtain the most up-to-date count values, as briefly described above (e.g., counting free blocks, etc.). After obtaining the up-to-date count values through scanning, the count values are set in the global counters 64, and all the in-memory delta counters 72 residing in the different nodes 22 are reset.

While various embodiments of the invention have been particularly shown and described, it will be understood by those skilled in the art that various changes in form and details may be made therein without departing from the scope of the invention as defined by the appended claims.

What is claimed is:

1. A method of updating a set of global counters stored in persistent storage accessible to a plurality of processing nodes of a data storage system, the global counters storing respective global count values describing associated units of data storage shared by the processing nodes for performing data storage operations, comprising:
   by each processing node, using a respective set of in-memory delta counters storing respective delta count values to track changes to respective global count values due to data storage operations performed by the processing node with respect to the units of data storage;
   regularly executing a summarization process to merge the delta count values of the delta counters of all processing nodes into the respective global counters;
   as part of a normal node shutdown, executing the summarization process and setting a summarization-complete flag indicating that the summarization process has successfully completed; and
   as part of a node start-up, determining based on the summarization-complete flag whether the summarization process successfully completed, and (1) if so, then commencing regular use of the delta counters based on their accuracy as established by the summarization process, (2) if not, then setting indicators that the delta counters are not trusted for use, and initiating recovery of correct values of the delta counters.

2. The method of claim 1, wherein the units of data storage are equal-size divisions of larger equal-size extents.

3. The method of claim 1, wherein the units of data storage each include a number of fixed-size blocks and the global counters track a number of free blocks for the respective units of data storage, and wherein using the in-memory delta counters includes reducing a count of free blocks whenever a set of blocks is newly allocated, and increasing the count of free blocks when blocks are newly deallocated.

4. The method of claim 1, wherein each processing node utilizes a locking mechanism to coordinate access to its delta counters.

5. The method of claim 4, wherein the locking mechanism includes a set of unique locks for respective groups of the delta counters.

6. The method of claim 5, wherein the units of data storage are equal-size divisions of larger equal-size extents, and wherein each group having a respective unique lock is a group of respective divisions across a plurality of the larger equal-size extents.

7. The method of claim 1, wherein updating a delta counter includes using an intent log to temporarily store records for updates for transactions that have not yet been committed to completion, the intent log being played out to set a new value of a delta counter when an associated transaction is committed, and the intent log being discarded without modifying a value of the delta counter if the associated transaction is aborted.

8. The method of claim 1, wherein initiating recovery of the correct values of the delta counters is in response to a crash of a processing node.

9. The method of claim 8, wherein recovery of the correct values of the delta counters includes re-calculating correct values for the global counters and setting the respective delta counters to zero.

10. The method of claim 9, wherein re-calculating correct values includes scanning each of the units of data storage to ascertain the correct values based on actual state of the units of data storage.

11. The method of claim 1, wherein the indicators are trusted bits each used to indicate a trusted state for the delta counters of an associated unit of storage data, and further including use of recovered bits each used to indicate a recovered state for the delta counters of the associated unit of storage data, the trusted bits and recovered bits being used at a time of attempted use of a delta counter to determine (1) whether the delta counter is trusted, and (2) if the delta counter is not trusted, whether the recovering has occurred and the delta counter can therefore become trusted.

12. The method of claim 11, wherein the use of the trusted bits and recovered bits includes:
   when a trusted bit has a value indicating that the delta counters are not trusted, then testing the associated recovered bit to determine whether recovery for the associated unit of data storage has been done;
   when the recovery bit indicates that the recovery has been done, then resetting the delta counters zero, setting the associated trusted bit to indicate that the delta counters are trusted, and resuming normal use of the delta counters; and
   when the recovery bit indicates that the recovery has not been done, then initiating the recovery, the recovery resulting in setting the recovery bit for the unit of data storage to indicate that the recovery has been performed.

13. A data storage system comprising physical data storage, an interface to data storage clients, and processing nodes executing computer program instructions to perform a method of updating a set of global counters stored in persistent storage accessible to the processing nodes, the global counters storing respective global count values describing associated units of data storage shared by the processing nodes for performing data storage operations, the updating method including:
   (1) by each processing node, using a respective set of in-memory delta counters storing respective delta count values to track changes to respective global count values due to data storage operations performed by the processing node with respect to the units of data storage,
   (2) regularly executing a summarization process to merge the delta count values of the delta counters of all processing nodes into the respective global counters, (3) as part of a normal node shutdown, executing the summarization process and setting a summarization-complete flag indicating that the summarization process has successfully completed, and (4) as part of a node start-up, determining based on the summarization-complete flag whether the summarization process successfully completed, and (A) if so, then commencing regular use of the delta counters based on their accuracy as established by the summarization process, (B) if not, then setting indicators that the delta counters are not trusted for use, and initiating the recovering of correct values of the delta counters.

14. The data storage system of claim 13, wherein each processing node utilizes a locking mechanism to coordinate access to its delta counters, the locking mechanism including a set of unique locks for respective groups of the delta counters.

15. The data storage system of claim 13, wherein updating a delta counter includes using an intent log to temporarily store records for updates for transactions that have not yet been committed to completion, the intent log being played out to set a new value of a delta counter when an associated transaction is committed, and the intent log being discarded without modifying a value of the delta counter if the associated transaction is aborted.

16. The data storage system of claim 13, wherein initiating recovery of the correct values of the delta counters is in response to a crash of a processing node.

17. The data storage system of claim 16, wherein recovery of the correct values of the delta counters includes re-calculating correct values for the global counters and setting the respective delta counters to zero.

18. The data storage system of claim 17, wherein re-calculating correct values includes scanning each of the units of data storage to ascertain the correct values based on actual state of the units of data storage.

19. The data storage system of claim 13, wherein the units of data storage each include a number of fixed-size blocks and the global counters track a number of free blocks for the respective units of data storage, and wherein using the in-memory delta counters includes reducing a count of free blocks whenever a set of blocks is newly allocated, and increasing the count of free blocks when blocks are newly deallocated.

20. The data storage system of claim 14, wherein the units of data storage wherein the units of data storage are equal-size divisions of larger equal-size extents, and wherein each group having a respective unique lock is a group of respective divisions across a plurality of the larger equal-size extents.

* * * * *